US006724756B2

United States Patent
Fourie et al.

(10) Patent No.: US 6,724,756 B2
(45) Date of Patent: *Apr. 20, 2004

(54) METHOD FOR INTRODUCING SWITCHED VIRTUAL CONNECTION CALL REDUNDANCY IN ASYNCHRONOUS TRANSFER MODE NETWORKS

(75) Inventors: Henry L. Fourie, Los Gatos, CA (US); Chun-Hung Lau, Foster City, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,150

(22) Filed: Jan. 12, 1999

(65) Prior Publication Data

US 2001/0002193 A1 May 31, 2001

(51) Int. Cl.[7] .................................................. H04J 3/16
(52) U.S. Cl. ...................................... 370/360; 370/216
(58) Field of Search ................................ 370/216, 217, 370/218, 219, 220, 221, 360, 386, 389, 390, 392, 395, 395.1, 503, 350, 351, 352, 401; 379/269, 242, 268; 709/223, 200, 213, 217, 218, 220, 226

(56) References Cited

U.S. PATENT DOCUMENTS 4,943,999 A    7/1990  Ardon
5,295,134 A *  3/1994  Yoshimura et al. .......... 370/220
5,345,438 A *  9/1994  Ozaki ........................... 370/220
5,365,590 A * 11/1994  Brame .......................... 380/49
5,537,611 A *  7/1996  Rajagopal et al. ........... 379/221
5,592,530 A *  1/1997  Brockman et al. ........ 379/32.03
5,649,089 A *  7/1997  Kilner ........................... 395/620
5,663,949 A *  9/1997  Ishibashi et al. ............. 370/220
5,678,006 A   10/1997  Valizadeh et al.
5,787,070 A    7/1998  Gupta et al.
5,818,843 A * 10/1998  Virdee et al. ................ 370/435
5,828,651 A * 10/1998  Jang et al. ................... 370/219
6,008,805 A   12/1999  Land et al.
6,034,945 A    3/2000  Hughes et al.
6,097,807 A    8/2000  Leslie et al.
6,185,222 B1   2/2001  Hughes et al.
6,434,612 B1 *  8/2002  Hughes et al. ............... 709/223

* cited by examiner

Primary Examiner—Dang Ton
(74) Attorney, Agent, or Firm—Blakely, Sokoloff, Taylor & Zafman LLP

(57) ABSTRACT

A method for sharing a call record between a first controller and a second controller is disclosed. The method comprises the step generating the call record in the first controller. For one embodiment, the call record comprises call parameters operable to establish a call connection between the first controller and a remote controller. The method also comprises the step of transferring the call record to the second controller. For one embodiment, the second controller performs as a stand-by controller and is able to take over the operations of the first controller in the event of failure of the first controller.

29 Claims, 5 Drawing Sheets

METHOD FOR INTRODUCING SWITCHED VIRTUAL CONNECTION CALL REDUNDANCY IN ASYNCHRONOUS TRANSFER MODE NETWORKS

FIELD OF THE INVENTION

The present invention relates to providing high service availability in networks. More particularly, the present invention relates to using both an active controller and standby controller to ensure continuous communication across a network in the event of network controller failure.

BACKGROUND

Asynchronous transfer mode ("ATM") networks use a cell-based switching and multiplexing technology to provide a general-purpose connection-oriented transfer mode for a wide range of services. These services include the simultaneous transfer of voice, video, and data between end-users connected to an ATM network. Examples of end-users include, but are not limited to, work stations, network nodes, and routers. Typically, each end-user relies on an ATM user-network interface ("UNI") and an edge switch to communicate across the ATM network. The edge switches allow the end-user to transmit across the multiple nodes of an ATM network by creating a virtual connection from one end-user to another end-user. Alternatively, edge switches are also used to create virtual connections from one end-user to multiple end-users.

The complexity of ATM networks led to the development of a Private Network-Node Interface ("PNNI") protocol. The PNNI protocol provides a signaling and routing protocol that relies on a hierarchical addressing scheme to summarize routing information. In particular, the routing protocol uses both a topology scheme and end-user hierarchical scheme to identify the address of all nodes and end-users in an ATM network. Accordingly, through the exchange of topology information over PNNI links, every node in the ATM network receives a hierarchically summarized version of the entire network. Given that a source node has a summarized view of the entire network, the source node uses the PNNI signaling protocol to set up an ATM connection along the path determined by the routing protocol.

FIG. 1 illustrates a prior art ATM network using a PNNI scheme. In particular, network 100 comprises a group of nodes (120–130) connected by links (141–146). As illustrated in FIG. 1, the combination of nodes and links form PNNI 110. Network 100 also includes end-users (115–118). PNNI 110 allows each end-user to transfer data, in the form of cells, to another end-user or a group of end-users. For example, a data transfer from end-user 115 to end-user 117 is performed along link 141. Alternatively, the same data transfer is performed via link 142, node 130, and line 143. As previously described, in a PNNI protocol the source node has a summarized view of the entire network. Accordingly, following the previous example, node 120 is aware of the different routing paths between end-user 115 and end-user 117. Thus, based on the network congestion found in PNNI 110, node 120 selects one of the paths between end-user 115 and end-user 117 and establishes a switched virtual connection ("SVC").

To establish the SVC, node 120 moves through three different phases. In the initial phase—also referred to as the call establishment phase—node 120 initiates a set up call using the address of the destination device. The setup call is routed through the intermediate nodes of PNNI 110 until the destination device is reached. The destination device responds with a call connect message that is transmitted back to node 120. When the call connect reaches node 120, node 120 transfers to a call active phase. In the call active phase, data is transmitted between end-user 115 of node 120 and the destination device. Subsequently, node 120 moves to the third phase—the release phase—and the call between node 120 and the destination device is terminated.

FIG. 2 shows a prior art switching circuit used in a node of an ATM network. In particular, network switch 200 has two planes of operation, a user plane and a control plane. The user plane deals with the actual user traffic managed by switch 210, call database 209, interfaces 220(a)–220(n), and interfaces 221(a)–221(n). In particular, switch 210 uses call data base 209 to maintain different virtual paths and virtual channel connections between interfaces 220(a)–220(n) and interfaces 221(a)–221(n). The control plane is set up by controller 215 and is responsible for setting up a connection between controller 215 and a remote controller via interface 221 or interface 220. For example, if network switch 200 is used in node 120 of network 100, One of the interfaces 220(a)–(n) is coupled to end-user 115. Additionally, a subset of interfaces 221(a)–(n) are coupled to links 141 and 142 and interface 221 is coupled to both links 141 and 142. Thus, the control plane of controller 215 is coupled to a controller in node 126 and a controller in node 130 via interface 221.

One of the functions maintained by the control plane is to ensure a continuous communications link between adjacent nodes in a network. Typically, the continuity of the communication link is maintained by a keep alive protocol in which each controller periodically checks the operation of controllers in adjacent nodes. Specifically, a controller will periodically transmit a query signal to the controller of an adjacent node or adjacent nodes. Each controller in an adjacent node responds to the query signal with a reply signal indicating that the controller is operating normally. In the event that the controller in the adjacent node does not respond to the query signal, the controller originating the query signal tears down (terminates) all active calls with the non responding adjacent node.

As illustrated in FIG. 2, network switch 200 includes a controller 215 coupled to switch 210 via line 225. Controller 215 generally controls the switching characteristics of switch 200 using line 225. In particular, controller 215 controls switch 200 using a call database (216) comprising switch control code, a connection routing protocol (217), and call control logic 218. The call database 216 contains information regarding each of the links connected to network switch 200 via interfaces 220(a)–220(n) and interfaces 221(a)–221(n). The call database 216 resides on controller 215. The call control logic 218 establishes and releases switched virtual connections under the control of the controller 215.

Controller 215 and switch 210 operate as a single network node. Controller 215 receives and processes connection routing protocol messages and determines which local resources of switch 210 are affected by the protocol messages. Switch 210, in turn, adds and deletes cross-connects as determined by controller 215 and logs the new switch connections in switch cross-connect database 209.

In this prior art switch and controller arrangement, a single controller supporting a network software layer is allowed to control the resources of the switch. Numerous disadvantages result from this configuration. One disadvantage results from a controller failure. In particular, a controller failure results in a failure of a node which in turn leads to the interruption of data transfers. Another disadvantage results from call tear-downs. Specifically, a controller failure results in an active call being dropped. The dropped call creates an interruption of service to the end user. Thus, resulting in service unavailability and a subsequent re-establishment of the call using alternate nodes.

SUMMARY OF THE INVENTION

A method for sharing a call record between a first controller and a second controller is disclosed. The method comprises the step of generating the call record in the first controller. For one embodiment, the call record comprises call parameters operable to establish a call connection between the first controller and a remote controller. The method also comprises the step of transferring the call record to the second controller. For one embodiment, the second controller performs as a stand-by controller. Thus, in the event of a failure by the first controller, the second controller maintains an active call connection between a node including the first controller and the second controller and a remote node including the remote controller.

For an alternative embodiment, the second controller uses the transferred call record to resynchronize communication with nodes adjacent to the node including the first controller and the second controller. For yet another embodiment, the second controller uses the transferred call record to resynchronize communication between the second controller and a switch.

Other features and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

A method for ensuring high service availability in an Asynchronous Transfer Mode ("ATM") network is disclosed. The high service availability is maintained via an active switch controller used in conjunction with a stand-by switch controller. To maintain high service availability, the active controller records the setup information of a given call in a journal entry (also referred to as a call record) and transfers the journal entries to the stand-by controller. Thus, in the event of a failure by the active controller, the network node switches over to the stand-by controller and active calls are maintained. For one embodiment, the journal entry is transferred from the active controller to the stand-by controller provided a call initiated by the active controller reaches an active state. For an alternative embodiment, the journal entry is deleted from both active and stand-by controllers when an active call is released (i.e. terminated) by the active controller or a remote controller. For another embodiment, subsequent to a switch-over to the stand-by controller, the newly active (formerly the stand-by) controller is synchronized with a switch used to connect the node including the first controller to remote nodes. Specifically, the call database of the newly active controller is resynchronized with a cross-connect database that exists on the switch. For yet another embodiment, subsequent to a switch-over to the stand-by controller, the newly active controller is synchronized with each controller on node or nodes adjacent to the node including the newly active controller.

An intended advantage of an embodiment of the invention is to provide a stand-by controller that can seamlessly take over all the operations from a failing active controller. Thus, providing a network node with a high service of availability.

Another intended advantage of an embodiment of the invention is to provide a Private to Private Network Interface ("PNNI") that has a high standard of availability.

Yet another intended advantage of an embodiment of the invention is to provide high availability in an ATM network despite a failure in an active controller by using a stand-by controller that provides a subset or all of the following: (1) ensures user plane connectivity is maintained for all active connections; (2) ensures the preservation of all cross-connects in the switch for an active call; (3) ensures the maintenance of control plane resources (e.g. call records and call reference values); (4) ensures resynchronization between the control plane and the user-plane after a switch-over from the active controller to the stand-by controller; and (5) ensures resynchronization between adjacent nodes after a switch-over from the active controller to the stand-by controller.

Figure 1:
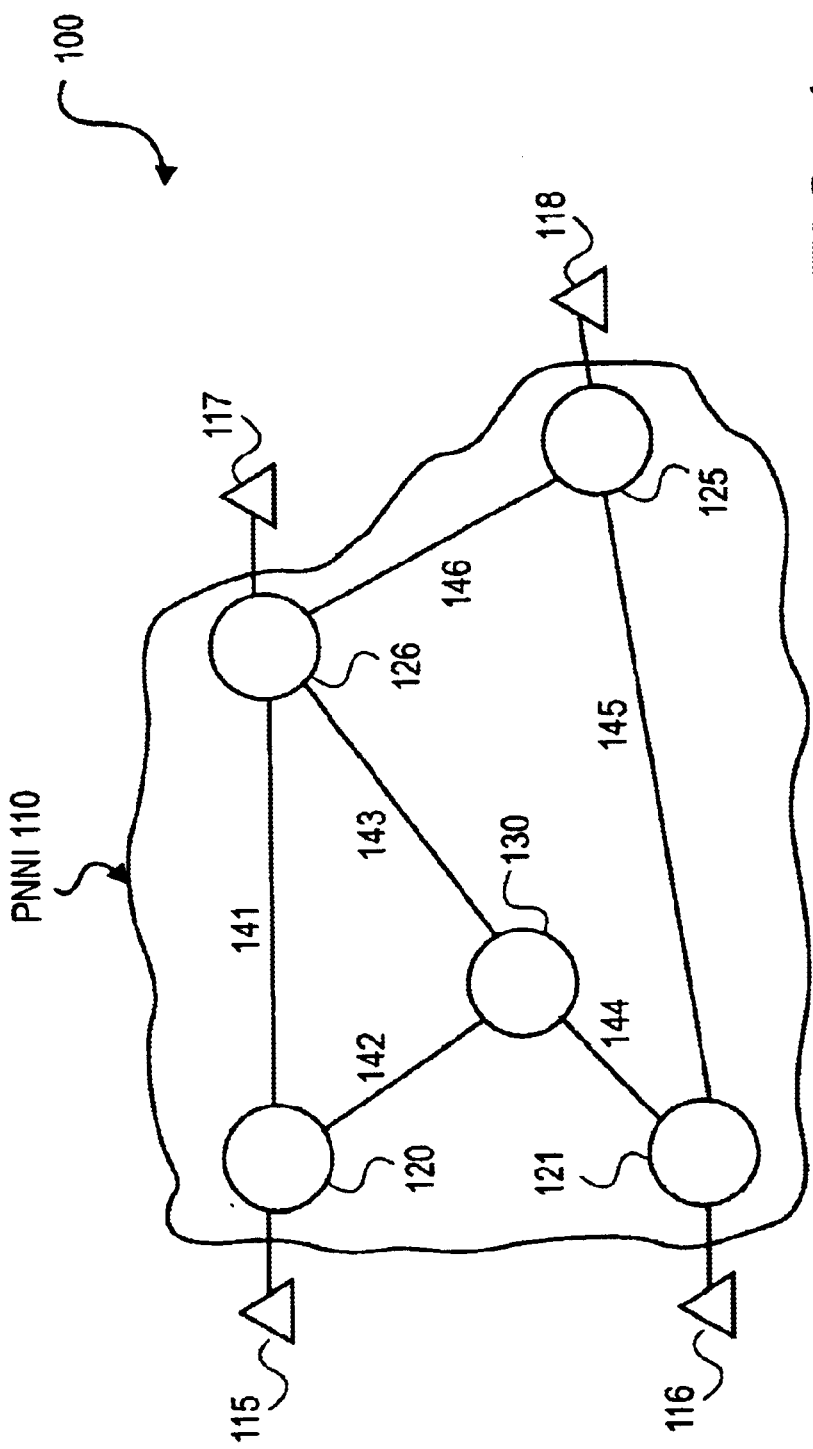
FIG. 1 shows a prior art ATM network using a PNNI scheme.
Figure 2:
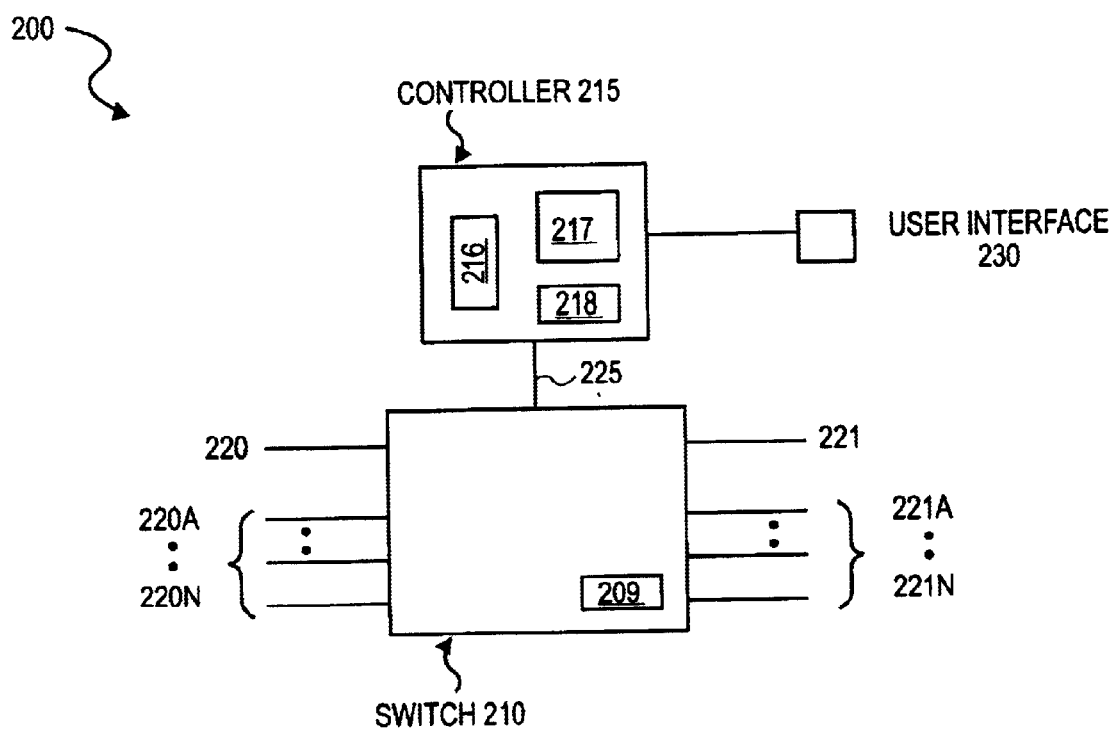
FIG. 2 shows a prior art switching circuit used in a node of an ATM.
Figure 3:
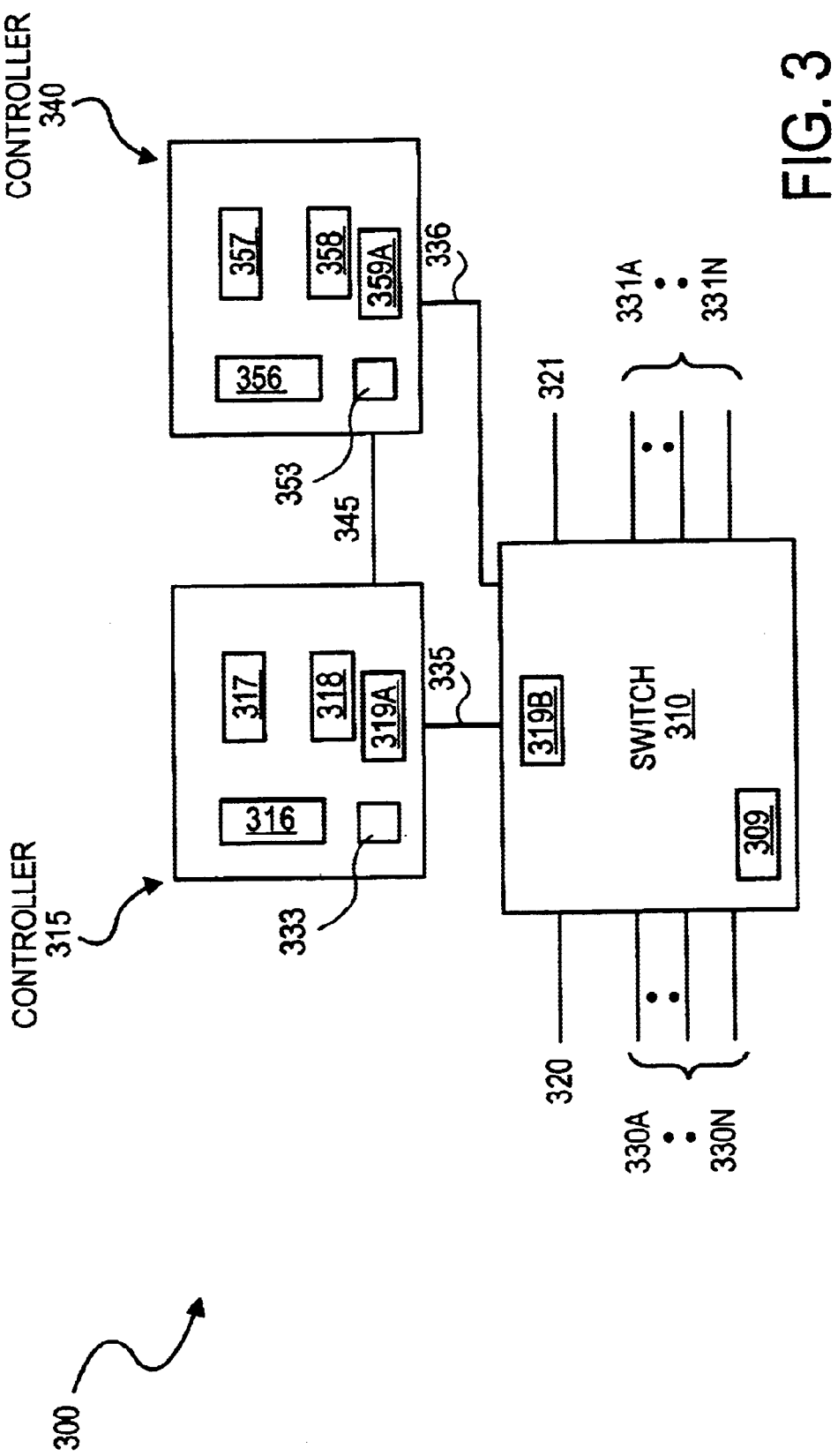
FIG. 3 shows one embodiment of a SVC call redundancy switching circuit used in a node of an ATM.

FIG. 3 shows one embodiment of a switched virtual connection ("SVC") call redundancy switching circuit used in an ATM node. In particular, network node 300 has two planes of operation, a user plane and a control plane which are respectively managed by switch 310 and controller 315. The user plane deals with the actual user traffic managed by switch 310, interfaces 330(a)–330(n), cross-connect database 309, and interfaces 331(a)–331(n). In particular, switch 310 uses cross-connect database 309 to maintain different virtual channel connections between interfaces 330(a)–330(n) and interfaces 331(a)–331(n). The control plane is managed by controller 315 and is responsible for setting up a connection between controller 315 and a remote controller via interface 321. For example, if network node 300 is used as a first node of an ATM network coupled to an end-user, One of the interfaces 320(a)–(n) is coupled to the end-user. Additionally, interfaces 321 and 321(a)–(n) are coupled to links connecting the first node to remote nodes. For an alternative embodiment, network node 300 is used as an intermediate node of an ATM network.

As illustrated in FIG. 3, controller 315 is attached to switch 310 via line 335. Controller 315 generally controls the switching characteristics of switch 310 using line 335. In particular, controller 315 controls switch 310 using a call database (316), a connection routing protocol (317), and call control logic (318). The call database 316 contains information for each of the calls established on network node 300 via interfaces 330(a)–330(n) and interfaces 331(a)–331(n). The call control logic 318 creates, deletes, and changes switch connections under the control of the controller 315 via line 335.

For one embodiment, controller 315 transmits a signal to switch 310 requesting the creation, deletion, or modification of a switch connection using line 335. Switch 310 accepts or rejects the request based on resource availability using line 335. Additionally, switch 310 notifies controller 315 of changes to the switch synchronization state or changes to the switch interface using line 335.

For one embodiment, the messages transmitted between controller 315 and switch 310 are controlled via switch interfaces 319a and 319b located on controller 315 and switch 310, respectively. Controller 315 perceives that it is controlling switch 310 via the application programmer interface ("API") of the switch interface. The API allows controller 315 to establish and release connections between network node 300 and remote nodes (not shown) by creating virtual connections via switch 310. The connection between network node 300 and a remote node includes, but is not limited to frame relay, circuit emulation, T1 channelized, T3 channelized, ATM permanent virtual circuits, and ATM switch virtual circuits.

For one embodiment, controller 315 comprises a state machine (not shown) that governs the progress of a call based on the following parameters: the status of the call; the messages transmitted from a remote node; or the specific connection path of a given call. In particular, controller 315 uses different states of the state machine to determine the specific switch connections of switch 310. For example, for one embodiment, a release signal is transmitted from a remote node to network node 300 via interface 321. The release signal results in the state machine of controller 315 transitioning to a state where controller 315 (via switch interface 319a) informs switch 310 to disconnect the active call between network node 300 and the remote node.

As illustrated in FIG. 3, controller 315 also includes a check point block (333). For one embodiment, check point block 333 transfers a call record (journal entry) for each active call maintained by network controller 315 to controller 340 using line 345. Specifically, for a given call, a call record includes information associated with the call such as, but not limited to, a call reference number, an interface number, a channel number, call accounting information, and traffic information. For alternative embodiments, the call record includes a subset of the aforementioned information associated with a call.

For one embodiment, the call record includes a call reference number, an interface number, and a channel number. The call reference number comprises a information field used to identify a given call by both controller 315 and each controller found in a node or nodes adjacent to network node 300. The interface number comprises an information field used to identify which interface a specific call is routed through The channel number comprises an information field used to identify the virtual channel used in a particular interface. The channel number used by switch 310 to identify a specific SVC consists of a virtual path identifier and a virtual channel identifier.

For another embodiment, in addition to a call reference number, an interface number, and a channel number the call record also includes call accounting information and traffic descriptors. The call accounting information comprises a sequence of data used to determine the billing requirements associated with a given call. Specifically, the start time of a call is included in the call accounting information, thus allowing a calculation of the billing information for a given call. The traffic descriptors include, but are not limited too, information describing cell rate, cell delay, cell delay variation and the service category—examples include specifying continuous versus non-continuous data stream as found in video versus audio data.

As previously described in a PNNI network each node consists of a controller and a switch. For one embodiment network node 300 is used in a PNNI network. Thus, controller 315 treats switch 310 as a single network node, addressing all communications destined for network node 300 to the network address of switch 310. Additionally, controller 315 receives and processes connection routing protocol messages and determines which local resources of switch 310 are affected by the protocol messages.

Network node 300 also includes a second controller, controller 340. As illustrated in FIG. 3, controller 340 is coupled to controller 315 via line 345. Additionally, controller 340 is coupled to switch 310 via line 336. Thus, controller 315 or alternatively controller 340 can control operation of switch 310.

For one embodiment, controller 340 is a stand-by controller and controller 315 is an active controller. Accordingly, controller 340 includes the same components as controller 315. For example, similar to controller 315, controller 340 includes a call database (356), a connection routing protocol (357), call control logic (358), a switch interface (359a), and a check point block (353). The similar components allow controller 340 to take over operation of network node 300 in the event of a hardware or software failure by controller 315. Specifically, a subset or alternatively all the data used to establish an active call by controller 315 is mirrored in controller 340. Thus, in the event of failure by controller 315 network node 300 switches over to controller 340.

To facilitate a seamless switch-over to controller 340, controller 315 transfers the call records stored in check point block 333 to check point block 353 via line 345. For example, for one embodiment, when a call maintained by network node 300 enters the active state, the call record associated with the call is transferred to check point block 353 via line 345. Thus, during a failure of controller 315, controller 340 can maintain all active calls initiated or transferred by network node 300.

For one embodiment, network node 300 is coupled to an adjacent node (not shown) via interface 321. Thus, subsequent to a switchover resynchronization between network node 300 and the adjacent node is performed to ensure that each node has a consistent set of active calls in their respective call databases. As previously described, in an ATM network including multiple nodes, the keep alive protocol ensures that a continuous communication link exists between adjacent nodes of the ATM network. During the switch-over by network node 300, however, there may be an interruption in the keep alive protocol. For one embodiment, the controller in the adjacent node detects the interruption in the keep alive protocol and initiates an audit procedure with the newly active controller, controller 340.

The audit procedure is used to determine whether active calls between adjacent nodes should be terminated—also referred to as the tear down of active calls. In particular, during the audit procedure, the adjacent node transmits a status inquiry message to network node 300. The status inquiry message includes the call reference numbers of the active calls between the adjacent node and network node 300. For one embodiment, using the call records stored in the call database 356, controller 340 compares the received call reference numbers to the call reference numbers of the call records in its own call database 356 that correlate to active calls between network node 300 and the adjacent node. Subsequently, controller 340 responds with a status message identifying the calls whose reference numbers match with the received call reference numbers.

For one embodiment, controller 340 uses the non-matching reference number to remove calls from call database 356, thus resynchronizing the call database in network node 300 with the call database in the adjacent node after a switch-over from controller 315 to controller 340. For an alternative embodiment, the adjacent node releases any calls not identified by the status message transmitted from controller 340, thus ensuring between the adjacent node and network node 300 after a switch-over.

For another embodiment, subsequent to a switch over, network node 300 ensures consistency between call parameters stored in controller 340 and switch 310. For one embodiment, prior to switchover call control logic 318 uses call records in call database 309 to establish cross-connects on switch 310 which are stored in cross-connect database 316 via switch interface 319a, interface 319b, and line 335. Subsequent to a switch-over, however, the call parameters stored in call database 309 and cross-connect database 356 may not be consistent, resulting in a dangling connection. A dangling connection describes a call that is maintained by either a controller or a switch despite the termination of the call. For one embodiment, controller 340 uses the call records stored in call database 356 to verify the consistency with cross-connect database 309. In particular, controller 340 compares the channel numbers and interface numbers included in the call records stored in call database 356 against the interface parameters currently used by switch 310—i.e., stored in cross-connect database 309. Accordingly, controller 340 adjusts either cross-connect database 309 or call database 356 to eliminate the dangling connections. This auditing procedure allows network node 300 to synchronize the control plane and user plane. For alternative embodiments, controller 340 reduces dangling connections by comparing accounting information or traffic information stored in check point block 353 against the interface parameters currently used by switch 310. For one embodiment, a multi-point call is generated by network node 300. A multi-point call describes a call which is broadcast from a single node to multiple remote nodes. In network node 300, when the initial multi-point call enters the active state, a root record is transferred from controller 315 to the call record of controller 340 via line 345. The root record describes a call record that includes information associated with the initial call in the multi-point call such as, but not limited to, a call reference number, an interface number, a channel number, call accounting information, and traffic information. Additionally, as each call to an additional party reaches an active state, a leaf record is transferred from controller 315 to controller 340 via line 345. The leaf record describes a call record that includes information associated with a call to an additional party in the multi-point call such as, but not limited to, a call reference number, an interface number, a channel number, call accounting information, and traffic descriptors. Accordingly, in the event that controller 315 incurs a software or hardware failure, controller 340 maintains all the active multi-point calls initiated by network node 300.

Figure 4:
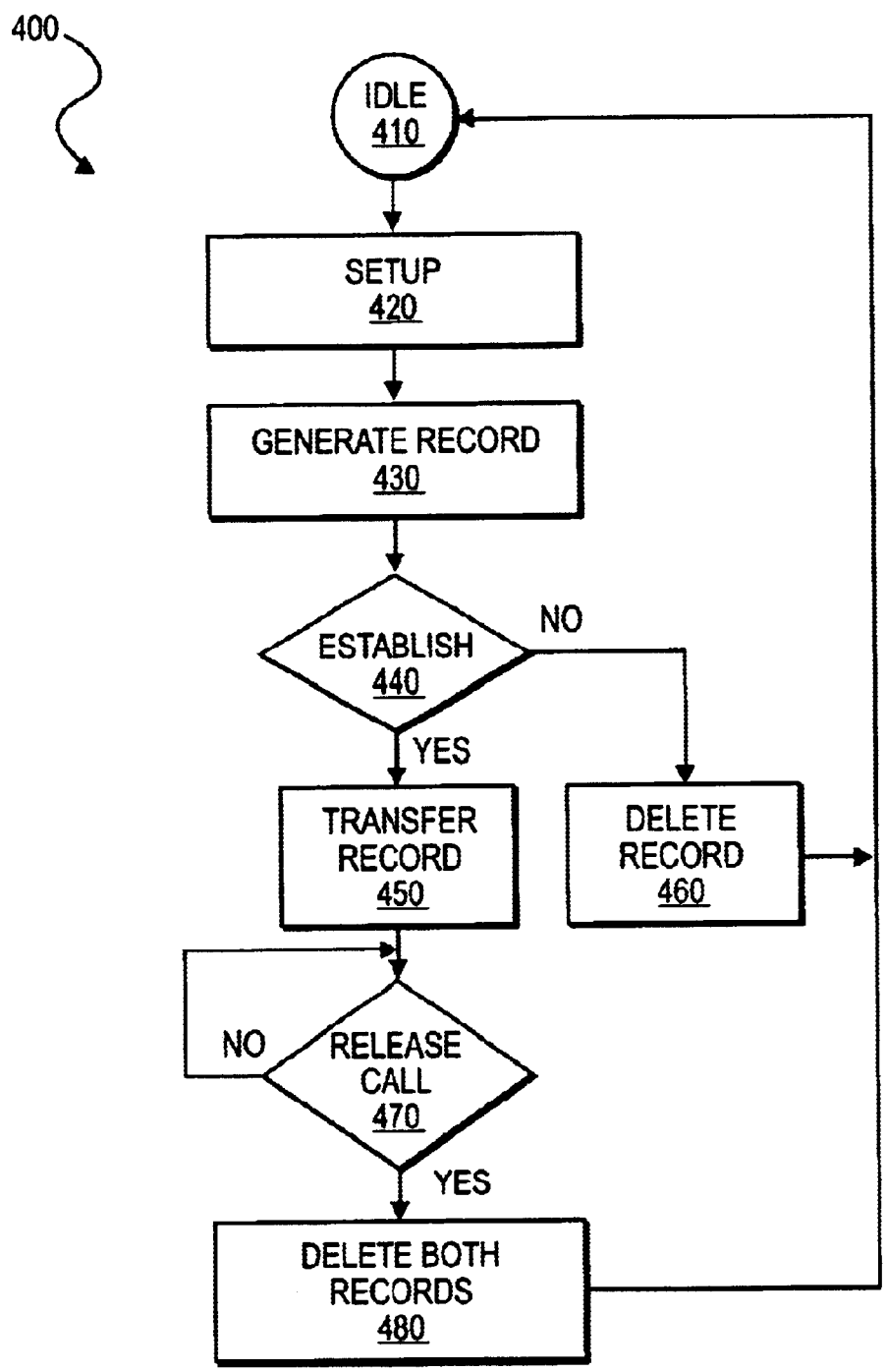
FIG. 4 shows one embodiment of a flow chart illustrating the transfer of a call record from an active controller to a stand-by controller.

FIG. 4 shows one embodiment of a flow chart illustrating the transfer of a call record from an active controller to a stand-by controller. In particular, flow chart 400 includes blocks 410 through 480, the blocks showing the steps used by network node 300 to generate and transfer a call record. Operation begins in block 410, prior to controller 315 receiving any request to either initiate a call from an edge device or switch a call from a remote node. For one embodiment, controller 315 receives a call setup request via interface 320 or interface 321. In particular, controller 315 receives a call setup request from a device coupled to network node 300 via interface 320 or a remote node coupled to network node 300 via interface 321.

A call setup request is processed at block 420. In particular, controller 315 examines the call setup request and attempts to initiate a connection with a remote node. For one embodiment, controller 315 uses switch 310 to transmit a setup call to the remote node. Specifically, using switch interfaces 319a and 319b controller 315 requests switch 310 to establish a SVC with the remote node. Subsequent to the request for the SVC, controller 315 generates a call record.

Call records are generated at block 430. As previously described, the call record includes all the call parameters used by network node 300 to maintain an SVC connection between the network switch and a remote node during a point-to-point call or a multi-point call. After generating the call record, controller 315 determines whether a call has been established with a remote node.

Call establishment is processed at decision block 440. In particular, at decision block 440, controller 315 determines whether a call—also referred to an active call—has been established between network node 300 and a remote node. For one embodiment, subsequent to a destination node receiving a call setup request, the destination node transmits a connect message to network node 300 via interface 321. Thus, when controller 315 receives a connect message on interface 321, controller 315 determines that a call has been established and block 450 is processed. If after a predetermined time, however, a connect message is not received by switch 310, block 460 is processed.

At block 460, controller 315 deletes the call record generated in state 430. The call record is deleted because an active call was not established by network node 300. After deletion of the call record, block 410 is processed. If a connect message is received by switch 310, however, the call record is not deleted and block 450 is processed.

At block 450, controller 315 transfers the call record to controller 340. In particular, at block 450 controller 315 transfers the call record generated at block 430 to controller 340. Subsequent to the call record transfer, decision block 470 is processed.

At decision block 470, controller 315 determines whether the active call has been released by the remote node or the device initiating the call. For one embodiment, subsequent to completing an active call a device coupled to network node 300, via interface 320, generates a release call message. For an alternative embodiment, a remote node coupled to network node 300, via interface 321, transmits a release call message after an active call is completed or disconnected. Thus, when controller 315 receives a release message on interfaces 320 or 321, controller 315 determines that a call has been released. If a call release message is received by switch 310, block 480 is processed, otherwise block 470 is re-processed.

At block 480, controller 315 deletes the call record. Specifically, controller 315 deletes the call record generated at block 430. Additionally, at block 480, controller 340 deletes the call record transferred to controller 340. Subsequent, to the deletion of both call records, block 410 is processed.

As previously described, FIG. 4 illustrates the steps used to generate and transfer a call record by network node 300. Maintaining a call record allows a stand-by controller to take over the call maintenance of an active controller, in the event of failure by the active controller. Additionally, using a call record allows the use of both an active controller and a stand-by controller in a network switch without synchronization concerns, thus maintaining a high service of availability in a network using network node 300. For one embodiment, the steps illustrated in flow chart 400 are used to generate and transfer call records between a controller and stand by controller in frame relay networks, circuit emulation networks, T1 channeled networks, T3 channeled networks, ATM switch permanent virtual circuit networks, and/or ATM switch virtual circuit networks. For an alternative embodiment, the steps illustrated in flow chart 400 are also used to generate and transfer a root record and leaf records for a multi-point call maintained by network node 300.

Figure 5:
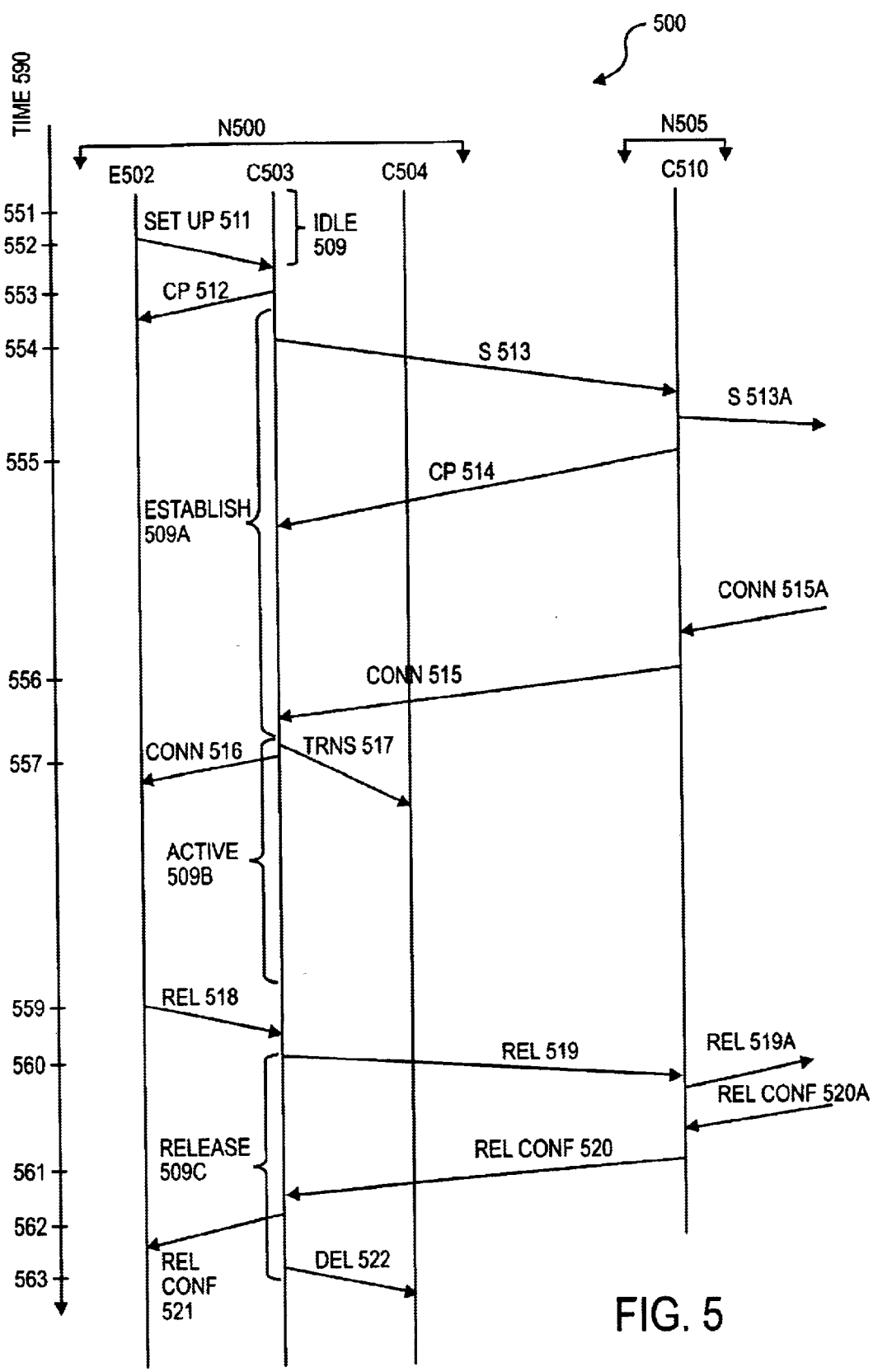
FIG. 5 shows one embodiment of a timing diagram showing a data record transfer between an active controller and a stand-by controller.

FIG. 5 shows one embodiment of a timing diagram illustrating the timing scheme involved in data record transfer between an active controller and a stand-by controller. In particular, timing chart 500 shows a vertical time axis (590). Timing chart 500 also shows a network node (N500) communicating with a remote network node (N505). N500 includes an edge device (E502), a controller (C503), and a stand-by controller (C504). For one embodiment, N500 includes network node 300. Accordingly, E502 is coupled to interface 320, C503 corresponds to controller 315, and C504 corresponds to controller 340. For alternative embodiments, node N500 and node N505 are coupled via a frame relay network, a circuit emulation network, a T1 channeled network, a T3 channeled network, an ATM switch permanent virtual circuit networks, or an ATM switch virtual circuit network.

As illustrated in FIG. 5, controller C530 operates in four phases. An idle phase (IDLE 509), an establishment phase (ESTABLISH 509a), an active phase (ACTIVE 509b), and a release phase (RELEASE 509c). In the IDLE 509 phase, controller C530 has not received any call request from edge device E502 or from node N505. In the ESTABLISH 590a phase, controller C530 attempts to establish a call connection with node N505. For one embodiment, node N500 initiates the call established in the ESTABLISH 509a phase. For an alternative embodiment, node N505 is an intermediate node. Thus, the call established in the ESTABLISH 509a phase is used to transfer a call between a remote node (not shown) and node N500.

After establishing the call, controller C530 transfers user data from edge device E502 to node N505 during the active phase, ACTIVE 509b phase. Finally, the established call is terminated in the release phase, RELEASE 509c. For one embodiment, node N500 initiates the call release. For another embodiment, node 505 initiates the release call. For yet another embodiment, node N505 is an intermediate node. Thus, the call release is transferred from a remote node (not shown) to node N500 via node N505.

The partition of controller C503 into different phases of operation allows controller C503 to transfer a call record to controller C504 during an active phase, thus ensuring that controller C504 receives call parameters for active calls. For example, for one embodiment, edge device E502 initiates a set up call (SET UP 511) requesting controller C503 to initiate a call with node N505. Controller C503, responds with a call proceeding (CP 512) message indicating that the request from edge device E502 is being processed. For one embodiment, N500 includes network node 300. Thus, prior to transmitting the call in progress signal, controller C503 requests an SVC connection from switch 310 via SI 319a. Provided the SVC request is accepted by switch 310, controller C503 transmits CP 512.

The set up request by E502 results in node N500 transmitting a set up message (S513) to node N505. For one embodiment, node N505 is the termination node of the call. Thus, node N505 responds with a connect message (CONN 515) transmitted back to node N500. For another embodiment, node N505 is an intermediate node used to transfer a call between node N500 and a remote node (not shown). Thus, node N505 initiates a second set up call (S513a) to the remote node. Node N505 also transmits a call proceeding message (CP 514) back to node N500. After the remote node has receive the set up call (S513a), the remote node responds to node N505 with a connect message (CONN 515A). Subsequent to receiving the connect message (CONN 515A), node N505 transmits the connect message (CONN 515) back to node N500.

The arrival of the connect message (CONN 515) denotes the transition from the call establishment phase (ESTABLISH 509a) to the active phase (ACTIVE 509b). For one embodiment, during the active phase controller C503 transfers the call record of the active call to controller C504, thus ensuring that controller 504 can maintain the active call connection if controller C503 fails. The transfer of the call record is denoted as TRNS 517.

The final stages of an active call are determined by the release of the call—denoted as phase RELEASE 509c. During phase RELEASE 509c, the transmitting device initiates a release message that informs remote nodes or devices to release an active call. For example, for one embodiment, during the release phase controller C503 transmits a delete record message (DEL 522) to controller C504. The DEL 522 message instructs controller C504 to delete the call record associated with a released call, thus ensuring controller 504 does reinstate an inactive call connection.

FIG. 5 illustrates one embodiment showing an active call released by edge device E502. In particular, edge device E502 transmits a release message (REL 518) to controller C503. Controller C503, in turn, transmits a release message (REL 519) to node N505. For one embodiment, N500 includes network node 300. Thus, C503 communicates witch switch 310 to transmit the release message (REL 519) to node N505.

For one embodiment, node N505 is the termination node of the call. Thus, after receiving the release message (REL 519), node N505 transmits a release confirmation message (REL CONF 520) back to node N500. For another embodiment, node N505 is an intermediate node used to transfer a call between node N500 and a remote node (not shown). Thus, node N505 transmits a second release message (REL 519a) to the remote node (not shown). After the remote node responds with a release confirmation message (REL CONF 520a), node N505 transmits a release confirmation message (REL CONF 520) back to node N500. Subsequent to reception of the release confirmation message (REL CONF 520), controller C503 transmits a release confirmation message (REL CONF 521) back to edge device E502. After transmitting the release confirmation message (REL CONF 521), controller C503 deletes the call record associated with the active call. The deleted records ensure that the record of an active call is removed after the call is released.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method for sharing a call record between a first controller and a second controller, the method comprising:
generating the call record in the first controller, wherein the call record comprises call parameters operable to establish a call connection between one of the first controller or the second controller and a remote controller, the remote controller residing in a different node than the first and second controllers; and
transferring the call record to the second controller.

2. The method of claim 1, wherein the call parameters are further operable to synchronize communication between one of the first controller or the second controller and a switch coupled to the first controller and the second controller.

3. The method of claim 1, wherein the call parameters are further operable to synchronize communication between one of the first controller or the second controller and the remote controller.

4. The method of claim 1, further comprising deleting the call record, wherein the call record is deleted subsequent to a call release message received by the first controller.

5. The method of claim 1, wherein the second controller is operable to perform as a stand-by controller.

6. The method of claim 4, wherein the call record is transferred to the second controller after the call connection between the first controller and the remote controller reaches a first phase.

7. The method of claim 6, wherein the first phase comprises an active phase.

8. The method of claim 6, wherein the call record is deleted in a second phase.

9. The method of claim 8, wherein the second phase comprises a release phase.

10. A method for reducing call termination in a network having a plurality of nodes, the method comprising:
generating a plurality of call records in a first controller of a first node of the plurality of nodes, wherein the call record comprises a set of call parameters of a plurality of active calls, wherein the set of call parameters comprises a plurality of call reference numbers, each call reference number of the plurality of call reference numbers corresponding to an active call of the plurality of active calls; and
transferring the plurality of call records to a second controller in the first node, wherein the second controller is operable to maintain the plurality of active calls.

11. The method of claim 10, wherein the second controller is operable to maintain the plurality of active calls in the event of failure in the first controller.

12. The method of claim 10, wherein the second controller is operable to synchronize communication with an adjacent node of the plurality of nodes.

13. The method of claim 12, wherein the synchronization of communication with the adjacent node comprises comparing a call parameter between the second controller and a third controller of the adjacent node.

14. The method of claim 10, wherein the second controller is operable to synchronize communication with a switch of the first node.

15. The method of claim 14, wherein the synchronization of communication with the switch comprises comparing a call parameter between the second controller and the switch.

16. The method of claim 15, wherein the call parameter comprises a switch interface number stored in the call record.

17. The method of claim 15, wherein the call parameter comprises a channel number stored in the call record.

18. A method of call management, comprising:
handling an active call by a first node using an active controller and a first switch;
switching to a standby controller of the first node in response to a failure of the active while maintaining the active call; and
synchronizing the standby controller of the first node to a second switch in an adjacent node subsequent to the switching, wherein each of the first node and the adjacent node have their own active controller and standby controller.

19. The method of claim 18, further comprising resynchronizing the standby controller with a remote controller in the adjacent node subsequent to the switching.

20. A method of claim 19, further comprising auditing the standby controller to determine whether the active call should be terminated.

21. A machine readable medium having stored thereon instructions which when executed by a processor cause the processor to perform the following:
generating a call record in a first controller, wherein the call record comprises call parameters operable to establish a call connection between one of the first controller or a second controller and a remote controller, the remote controller residing in a different node than the first and second controllers; and
transferring the call record to the second controller.

22. The machine readable medium of claim 21, wherein the call parameters are further operable to synchronize communication between one of the first controller or the second controller and a switch coupled to the first controller and the second controller.

23. The machine readable medium of claim 21, wherein the call parameters are further operable to synchronize communication between one of the first controller or the second controller and the remote controller.

24. The machine readable medium of claim 21, further comprising deleting the call record, wherein the call record is deleted subsequent to a call release message received by the first controller.

25. A network node, comprising
means for generating a call record in a first controller, wherein the call record comprises call parameters operable to establish a call connection between one of the first controller or a second controller and a remote controller, the remote controller residing in a different node than the first and second controllers; and
means for transferring the call record to the second controller.

26. The network node of claim 25, further comprising means for synchronizing communication between one of the first controller or the second controller and a switch coupled to the first controller and the second controller.

27. The network node of claim 25, further comprising means for synchronizing communication between one of the first controller or the second controller and the remote controller.

28. The network node of claim 25, further comprising means for deleting the call record subsequent to a call release message received by the first controller.

29. The method of claim 18, wherein synchronizing comprises synchronizing a call database of the standby controller with a cross-connect database of the adjacent switch.

* * * * *